(12) United States Patent
Noviello (10) Patent No.: US 11,620,705 B2
(45) Date of Patent: Apr. 4, 2023

(54) SYSTEM AND METHOD FOR PROVIDING AN OPERATOR INTERFACE FOR DISPLAYING MARKET DATA, TRADER OPTIONS, AND TRADER INPUT

(71) Applicant: BGC PARTNERS, INC., New York, NY (US)

(72) Inventor: Joseph C. Noviello, Summit, NJ (US)

(73) Assignee: BGC PARTNERS, INC., New York, NY (US)

( * ) Notice: Subject to any disclaimer, the term of this patent is extended or adjusted under 35 U.S.C. 154(b) by 0 days.

(21) Appl. No.: 16/886,841

(22) Filed: May 29, 2020

(65) Prior Publication Data

US 2020/0294145 A1 Sep. 17, 2020

Related U.S. Application Data

(63) Continuation of application No. 11/686,695, filed on Mar. 15, 2007, now abandoned.

(51) Int. Cl.
    *G06Q 40/04* (2012.01)
    *G06F 3/04847* (2022.01)

(52) U.S. Cl.
    CPC ......... *G06Q 40/04* (2013.01); *G06F 3/04847* (2013.01)

(58) Field of Classification Search
    CPC ..... G06Q 40/04; G06Q 40/00; G06F 3/04847
    USPC .......................................................... 705/37
    See application file for complete search history.

(56) References Cited

U.S. PATENT DOCUMENTS

| 4,720,758 A | 1/1988 | Winslow |
| 5,243,331 A | 9/1993 | McCausland et al. |
| 5,315,364 A | 5/1994 | Arion et al. |
| 5,321,765 A | 6/1994 | Costello |
| 5,461,217 A | 10/1995 | Claus |
| 5,605,505 A | 2/1997 | Han |

(Continued)

FOREIGN PATENT DOCUMENTS

| EP | 0 394 614 A2 | 1/1990 |
| EP | 0 206 565 B1 | 4/1991 |

(Continued)

OTHER PUBLICATIONS

Graphical Interface for Market Asset Pricing Estimation with LSTM. Prasad, Pragada, Pallavi, Triveni, Praneeth. GMR Institute of Technology, Rajam. Journal of Pharmaceutical Negative Results, vol. 13, Special Issue 5. (Year: 2022).*

(Continued)

*Primary Examiner* — Mike Anderson
*Assistant Examiner* — John O Preston (57) ABSTRACT

A system for providing an operator interface for displaying market data, trader options, and trader input includes a memory and a processor. The memory stores market data for a trading product, where the market data includes an inside market price for the trading product. The processor initiates display of a market data section of a tile, where the market data section comprises the market data. The processor initiates display of a trader input section of the tile, where the trader input section comprises options. The processor receives a selection of a bid-offer pair for the trading product from the options, and updates the trader input section to indicate the selected bid-offer pair.

19 Claims, 3 Drawing Sheets

(56) References Cited

U.S. PATENT DOCUMENTS

| | | | |
|---|---|---|---|
| 5,644,113 A * | 7/1997 | Date | H01H 25/041 200/6 A |
| 5,804,781 A | 9/1998 | Okabe | |
| 5,853,326 A | 12/1998 | Goto et al. | |
| 5,896,125 A | 4/1999 | Niedzwiecki | |
| 5,903,880 A | 5/1999 | Biffar | |
| 5,984,785 A * | 11/1999 | Takeda | A63F 13/02 345/161 |
| 5,991,431 A | 11/1999 | Borza | |
| 6,071,194 A | 6/2000 | Sanderson et al. | |
| 6,105,006 A | 8/2000 | Davis et al. | |
| 6,184,665 B1 | 2/2001 | Salina et al. | |
| 6,213,880 B1 | 4/2001 | Sim | |
| 6,231,880 B1 | 5/2001 | Perrine | |
| 6,251,012 B1 | 6/2001 | Horigami et al. | |
| 6,272,474 B1 | 8/2001 | Garcia | |
| 6,311,167 B1 | 10/2001 | Davis et al. | |
| 6,400,996 B1 | 6/2002 | Hoffberg et al. | |
| 6,422,941 B1 | 7/2002 | Thorner et al. | |
| 6,505,175 B1 | 1/2003 | Silverman et al. | |
| 6,538,636 B1 | 3/2003 | Harrison | |
| 6,585,599 B1 | 7/2003 | Horigami et al. | |
| 6,615,299 B1 | 9/2003 | Chu et al. | |
| 6,625,583 B1 | 9/2003 | Silverman et al. | |
| 6,727,890 B2 | 4/2004 | Andres et al. | |
| 6,903,880 B2 | 6/2005 | Beatson et al. | |
| 6,938,011 B1 | 8/2005 | Kemp, II et al. | |
| 7,106,569 B2 | 9/2006 | Liu et al. | |
| 7,116,310 B1 | 10/2006 | Evans et al. | |
| 7,138,775 B2 | 11/2006 | Sugimoto et al. | |
| 7,138,819 B2 | 11/2006 | Hashimoto | |
| 7,167,860 B1 | 1/2007 | Black et al. | |
| 7,207,885 B2 | 4/2007 | Longman | |
| 7,228,289 B2 | 6/2007 | Brumfield et al. | |
| 7,283,067 B2 | 10/2007 | Lutnick et al. | |
| 7,587,357 B1 * | 9/2009 | Buck | G06Q 40/04 705/37 |
| 8,170,945 B2 | 5/2012 | Longman | |
| 8,208,237 B2 | 6/2012 | Celenza et al. | |
| 8,452,695 B2 | 5/2013 | Longman et al. | |
| 8,469,808 B2 | 6/2013 | Longman et al. | |
| 8,834,278 B2 | 9/2014 | Longman | |
| 8,840,471 B2 | 9/2014 | Longman | |
| 2001/0040562 A1 | 11/2001 | Masudaya | |
| 2001/0045938 A1 | 11/2001 | Willner et al. | |
| 2001/0053712 A1 | 12/2001 | Yoseloff et al. | |
| 2002/0007335 A1 | 1/2002 | Millard et al. | |
| 2002/0070915 A1 | 6/2002 | Mazza et al. | |
| 2002/0099634 A1 | 7/2002 | Coutts et al. | |
| 2002/0099895 A1 | 7/2002 | Landron et al. | |
| 2002/0113987 A1 | 8/2002 | Kohli | |
| 2002/0163597 A1 * | 11/2002 | Kelleher | H04N 7/0125 348/451 |
| 2002/0165794 A1 | 11/2002 | Ishihara | |
| 2002/0184500 A1 | 12/2002 | Maritzen et al. | |
| 2003/0009411 A1 | 1/2003 | Ram et al. | |
| 2003/0018569 A1 | 1/2003 | Eisenthal et al. | |
| 2003/0021673 A1 | 1/2003 | Maejima | |
| 2003/0065609 A1 | 4/2003 | Oh | |
| 2003/0103038 A1 | 6/2003 | Wong et al. | |
| 2003/0103127 A1 | 6/2003 | Khormaei et al. | |
| 2003/0126063 A1 | 7/2003 | Reuter et al. | |
| 2003/0158796 A1 | 8/2003 | Balent | |
| 2003/0167847 A1 | 9/2003 | Brown et al. | |
| 2003/0187771 A1 | 10/2003 | Bulan | |
| 2003/0187795 A1 | 10/2003 | Lee et al. | |
| 2003/0214093 A1 | 11/2003 | Schambre et al. | |
| 2003/0216173 A1 | 11/2003 | Gauselmann | |
| 2003/0216185 A1 | 11/2003 | Varley | |
| 2004/0068458 A1 * | 4/2004 | Russo | G06Q 40/04 705/36 R |
| 2004/0078287 A1 | 4/2004 | Yang | |
| 2004/0100511 A1 | 5/2004 | Wong et al. | |
| 2004/0103054 A1 | 5/2004 | Singer | |
| 2004/0103127 A1 | 5/2004 | Bjornson | |
| 2004/0117292 A1 | 6/2004 | Brumfield et al. | |
| 2004/0117331 A1 | 6/2004 | Lutnick et al. | |
| 2004/0117358 A1 | 6/2004 | von Kaenel et al. | |
| 2004/0153394 A1 | 8/2004 | West et al. | |
| 2004/0167847 A1 | 8/2004 | Nathan | |
| 2004/0209596 A1 | 10/2004 | Wong et al. | |
| 2004/0210504 A1 | 10/2004 | Rutman | |
| 2004/0224768 A1 | 11/2004 | Hussaini et al. | |
| 2004/0249699 A1 | 12/2004 | Laurent et al. | |
| 2005/0027642 A1 | 2/2005 | Howorka et al. | |
| 2005/0060255 A1 | 3/2005 | Heaton | |
| 2005/0125328 A1 | 6/2005 | Schluetter | |
| 2005/0137955 A1 | 6/2005 | Downie et al. | |
| 2005/0144113 A1 * | 6/2005 | Opperman | G06Q 40/06 705/37 |
| 2005/0239523 A1 | 10/2005 | Longman et al. | |
| 2005/0239524 A1 | 10/2005 | Longman et al. | |
| 2006/0046854 A1 | 3/2006 | Arevalo Baeza et al. | |
| 2006/0136759 A1 | 6/2006 | Koo | |
| 2006/0148559 A1 | 7/2006 | Jordan et al. | |
| 2006/0253384 A1 | 11/2006 | Rutt et al. | |
| 2006/0259417 A1 | 11/2006 | Marynowski et al. | |
| 2006/0265321 A1 | 11/2006 | Brumfield et al. | |
| 2006/0287027 A1 * | 12/2006 | Hardisty | A63F 13/5255 463/8 |
| 2007/0005481 A1 * | 1/2007 | Kedia | G06Q 40/04 705/37 |
| 2007/0038549 A1 | 2/2007 | Janowski et al. | |
| 2007/0118452 A1 | 5/2007 | Mather et al. | |
| 2007/0150401 A1 | 6/2007 | Brucato et al. | |
| 2007/0188452 A1 | 8/2007 | Chen et al. | |
| 2007/0191113 A1 | 8/2007 | Longman | |
| 2007/0191114 A1 | 8/2007 | Longman | |
| 2007/0208647 A1 | 9/2007 | Gemuenden et al. | |
| 2008/0228618 A1 | 9/2008 | Noviello | |
| 2008/0288391 A1 * | 11/2008 | Downs | G06Q 40/04 705/37 |
| 2011/0238555 A1 * | 9/2011 | Rosenthal | G06Q 40/04 705/37 |
| 2014/0040094 A1 | 2/2014 | Longman | |

FOREIGN PATENT DOCUMENTS

| | | |
|---|---|---|
| EP | 0 813 175 A2 | 12/1997 |
| EP | 0434224 B1 | 7/1999 |
| EP | 0813 175 A3 | 3/2000 |
| EP | 1208883 | 5/2002 |
| EP | 1555603 A2 | 7/2005 |
| GB | 2 392 763 | 3/2004 |
| JP | 6-149460 | 5/1994 |
| JP | 11-288352 | 10/1999 |
| JP | 2001-195475 | 7/2001 |
| JP | 2001-312359 | 11/2001 |
| JP | 2002032185 | 1/2002 |
| JP | 2002-215298 | 7/2002 |
| JP | 2002 287876 | 10/2002 |
| JP | 2002-342021 | 11/2002 |
| JP | 2003-24634 | 1/2003 |
| JP | 2003-117237 | 4/2003 |
| JP | 2004/30160 | 1/2004 |
| JP | 2004/38953 | 2/2004 |
| JP | 2004-272374 | 9/2004 |
| JP | 2005 063409 | 3/2005 |
| WO | WO 95/16971 | 6/1995 |
| WO | WO 95/06918 | 9/1995 |
| WO | WO 00/61252 | 10/2000 |
| WO | WO 01/25989 | 4/2001 |
| WO | WO 01/26003 | 4/2001 |
| WO | WO 01/71672 A1 | 9/2001 |
| WO | WO/2002/098054 | 12/2002 |
| WO | WO 2004/036725 | 4/2004 |
| WO | WO 2005/069819 A2 | 8/2005 |

(56) References Cited

FOREIGN PATENT DOCUMENTS

| | | |
|---|---|---|
| WO | 2006015336 | 2/2006 |
| WO | WO 2008/112985 | 9/2008 |

OTHER PUBLICATIONS

Evaluation of the Tobii EyeX Eye tracking controller and Matlab toolkit for research. Gibaldi, Vanegas, Bex, and Maiello. Springerlink.com. Jul. 11, 2016. (Year: 2016).*
ASETS—An Academic Trading Simulation Platform. Vinte, Lixandru, Jurubita, Bardan. Informatica Economica, vol. 14, No. Feb. 2010 (Year: 2010).*
U.S. Appl. No. 10/759,693, filed Jan. 15, 2004, Longman.
U.S. Appl. No. 11/172,018, filed Jun. 29, 2005, Longman et al.
U.S. Appl. No. 11/686,695, filed Mar. 15, 2007, Noviello.
Notification of Transmittal of the International Search Report and the Written Opinion of the International Searching Authority, or the Declaration for International Application No. PCT/US06/23801, 9 pages, dated Oct. 5, 2007.
UK Intellectual Property Office Examination Report for Application No. GB0500841.2, 5 pages, dated May 23, 2007.
USPTO Office Action for U.S. Appl. No. 11/686,695, dated Nov. 14, 2008 (17 pages).
USPTO Office Action for U.S. Appl. No. 11/686,695, dated Jun. 25, 2009 (22 pages).
Notification of Transmittal of the International Search Report and the Written Opinion of the International Searching Authority for International Application No. PCT/US08/57021; dated Jun. 24, 2008 (9 pages).
Schwartz, Robert A., Next-Generation Securities Market Systems: an Experimental Investigation of Quote-Driven and Order-Driven Trading, Journal of Management Information Systems, vol. 14, No. 2, pp. 57-79; Date: Fall 1997.
Forsyth, Randall, W., Editor, "After the Fall Want to bet on- or against-the depressed buck? Electronic currency trading goes mainstream", The Electronic Investor, Barron's Technology Week, cover and pp. T4-T5; Date: Nov. 22, 2004.
USPTO Office Action for U.S. Appl. No. 10/759,693, dated Jul. 5, 2005 (16 pages).
USPTO Office Action for U.S. Appl. No. 10/759,693, dated Dec. 22, 2005 (17 pages).
USPTO Office Action for U.S. Appl. No. 10/759,693, dated Apr. 20, 2006 (3 pages).
USPTO Office Action for U.S. Appl. No. 10/759,693, dated Jul. 25, 2006 (16 pages).
USPTO Notice of Allowance for U.S. Appl. No. 10/759,693, dated Dec. 14, 2006 (7 pages).
Provisional Application entitled, "Fully Configurable Trading Keyboard," by Howard W. Lutnick et al., 7 pages plus 3 pages of drawings; filed May 10, 2004.
USPTO Office Action for U.S. Appl. No. 11/172,018, dated Jun. 7, 2010 (10 pages).
USPTO Pre-Brief Appeal Conference Decision for U.S. Appl. No. 11/686,695, Oct. 20, 2009 (2 pages).
Australian Examination Report for Application No. 2005206861, dated Feb. 23, 2010 (2 pages).
International Preliminary Report on Patentability for International Application No. PCT/US08/57021, dated Sep. 15, 2009 (5 pages).
International Preliminary Report on Patentability for International Application No. PCT/US2005/001084, dated Jul. 17, 2006 (9 pages).
Australian Examination Report for Application No. 2006266290, dated Jan. 22, 2009 (2 pages).
International Preliminary Report on Patentability for International Application No. PCT/US06/23762, dated Jan. 9, 2008 (6 pages).
International Preliminary Report on Patentability for International Application No. PCT/US06/23801, dated Jan. 9, 2008 (6 pages).
Canadian Examination Report for Application No. 2611879, dated Jun. 9, 2010 (3 pages).
UK Intellectual Property Office Decision on UK Patent Application No. GB0802593.4, dated Jan. 12, 2009 (12 pages).
European Patent Office Communication and Extended European Search Report for Application No. 06773508.4, dated Jul. 2, 2010 (8 pages).
USPTO Office Action for U.S. Appl. No. 11/738,884, dated Aug. 31, 2010 (14 pages).
USPTO Office Action for U.S. Appl. No. 11/171,809, dated Aug. 16, 2010 (15 pages).
Diane Kaye Walkowiak, Joysticks Get More From your Games by Fixing your Joystick, Smart Computing, Input & Output, Mar. 1998, vol. 2, Issue 1.
Tuan Le, Turn on the Sticky Keys Feature, Microsoft Corporation, Feb. 11, 2002.
Bill Camarda, Adding a New Auto Correct Entry, Special Edition Using Microsoft Office Word 2003, p. 293, Que Publishing (Dec. 2003).
USPTO Office Action for U.S. Appl. No. 11/172,018, dated Oct. 13, 2010 (20 pages).
Japanese Office Action with English translation for Application No. 2008-519371, dated Sep. 14, 2010 (5 pages).
USPTO Office Action for U.S. Appl. No. 11/738,824, dated Nov. 18, 2010 (15 pages).
Japanese Office Action with English translation for Application No. 2008-519364, dated Nov. 16, 2010 (7 pages).
Canadian Examination Report for Application No. 2611880, dated Jul. 19, 2010 (3 pages).
Japanese Office Action with English translation for Application No. 2006-549590, dated Dec. 14, 2010 (4 pages).
Australian Notice of Acceptance for Application No. 2006266299, dated Apr. 13, 2011 (3 pages).
Japanese Office Action with English translation for Application No. 2008-519364, dated Jun. 7, 2011 (4 pages).
USPTO Office Action for U.S. Appl. No. 11/738,824, dated Jul. 14, 2011 (17 pages).
USPTO Office Action for U.S. Appl. No. 11/171,809, dated Jun. 24, 2011 (20 pages).
Maximum Windows 2000 Security by Mark Burnett et al., Copyright 2002.
USPTO Notice of Allowance and Fees Due and Examiner Interview Summary for U.S. Appl. No. 11/172,018, dated Jun. 24, 2011 (20 pages).
USPTO Office Action for U.S. Appl. No. 11/686,695, dated Sep. 15, 2011 (23 pages).
Japanese Office Action with English translation for Application No. 2008-519371, dated Oct. 4, 2011 (9 pages).
Apple Computer, Inc., "Technical Note 2056: Installable Keyboard Layouts," dated Sep. 27, 2002 (retrieved from Internet Archive on Oct. 3, 2002 located at URL: http://web.archive.org/web/20021003023242/http://developer.apple.com/technotes/tn2002/tn2056.html).
Australian Notice of Acceptance for Application No. 2005206861, dated Nov. 23, 2011 (3 pages).
Japanese Office Action with English translation for Application No. 2006-549590, dated Nov. 29, 2011 (4 pages).
Canadian Examination Report for Application No. 2553348, dated Dec. 21, 2011 (2 pages).
USPTO Office Action for U.S. Appl. No. 11/738,884, dated Oct. 26, 2011 (10 pages).
USPTO Notice of Allowance and Fees Due for U.S. Appl. No. 11/172,018, dated Oct. 17, 2011 (8 pages).
"Transaction Cycle of Agents and Web-Based Gaming Simulation for International Emissions Trading," by Hideyuki Mizuta and Yoshiki Yamagata. Proceedings of the 2002 Winter Simulation Conference. E. Yucesan, C.H. Chen, J.L. Snowdon, and J.M. Charnes, eds. Published: 2002. (Year: 2002).

\* cited by examiner

SYSTEM AND METHOD FOR PROVIDING AN OPERATOR INTERFACE FOR DISPLAYING MARKET DATA, TRADER OPTIONS, AND TRADER INPUT

CROSS REFERENCE TO RELATED APPLICATION

This application is a continuation of U.S. patent application Ser. No. 11/686,695 filed on Mar. 15, 2007, the disclosure of which is hereby incorporated by reference herein in its entirety.

TECHNICAL FIELD

This invention relates generally to the field of operator interface processing and more specifically to a system and method for providing an operator interface for displaying market data, trader options, and trader input.

BACKGROUND

In recent years, electronic trading systems have gained widespread acceptance for trading a wide variety of items, such as goods, services, financial instruments, and commodities. For example, electronic trading systems may be used to trade stocks, fixed income securities, currencies, futures contracts, oil, and gold.

Electronic trading systems may have a number of client systems connected to a trading platform. A client system may include input devices, such as keyboards or mouse devices, that may be used to communicate with the trading system. In some instances, keyboards may be specifically designed for use with a trading system.

SUMMARY OF THE DISCLOSURE

In accordance with the present invention, disadvantages and problems associated with previous techniques for displaying market data, trader options, and trader input may be reduced or eliminated.

According to one embodiment of the present invention, a system for displaying market data, trader options, and trader input includes a memory and a processor. The memory stores market data for a trading product, where the market data includes an inside market price for the trading product. The processor initiates display of a market data section of a tile, where the market data section comprises the market data. The processor initiates display of a trader input section of the tile, where the trader input section comprises options. The processor receives a selection of a bid-offer pair for the trading product from the options, and updates the trader input section to indicate the selected bid-offer pair.

Certain embodiments of the invention may provide one or more technical advantages. A technical advantage of one embodiment may be that a display has tiles that display information about trading products to a trader. A tile displays market data for a particular trading product. The market data may include a bid quantity, an inside market price, and an offer quantity. The tile also displays options from which the trader may select to designate desired conditions for initiating a trade for the trading product. The options may include quantities of and bid-offer pairs for the trading product. The trader may use knobs of a game controller device to make selections. One knob may be used to select a quantity, and another knob may be used to select a bid-offer pair. Thus, the trader may use the tile and the game controller device to easily select a quantity and a bid-offer pair for the trading product.

Another technical advantage of one embodiment may be that buttons of the game controller device may be used to initiate specific types of trades. One button may be used to initiate a bid and/or buy at the quantity and bid-offer pair selected by the trader. Another button may be used to initiate an offer and/or sell at the quantity and bid-offer pair selected by the trader. Yet another button may be used to initiate a buy at the inside market price. And, yet another button may be used to initiate a sell at the inside market price. Thus, a trader can readily initiate different types of trades using the buttons of the game controller device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
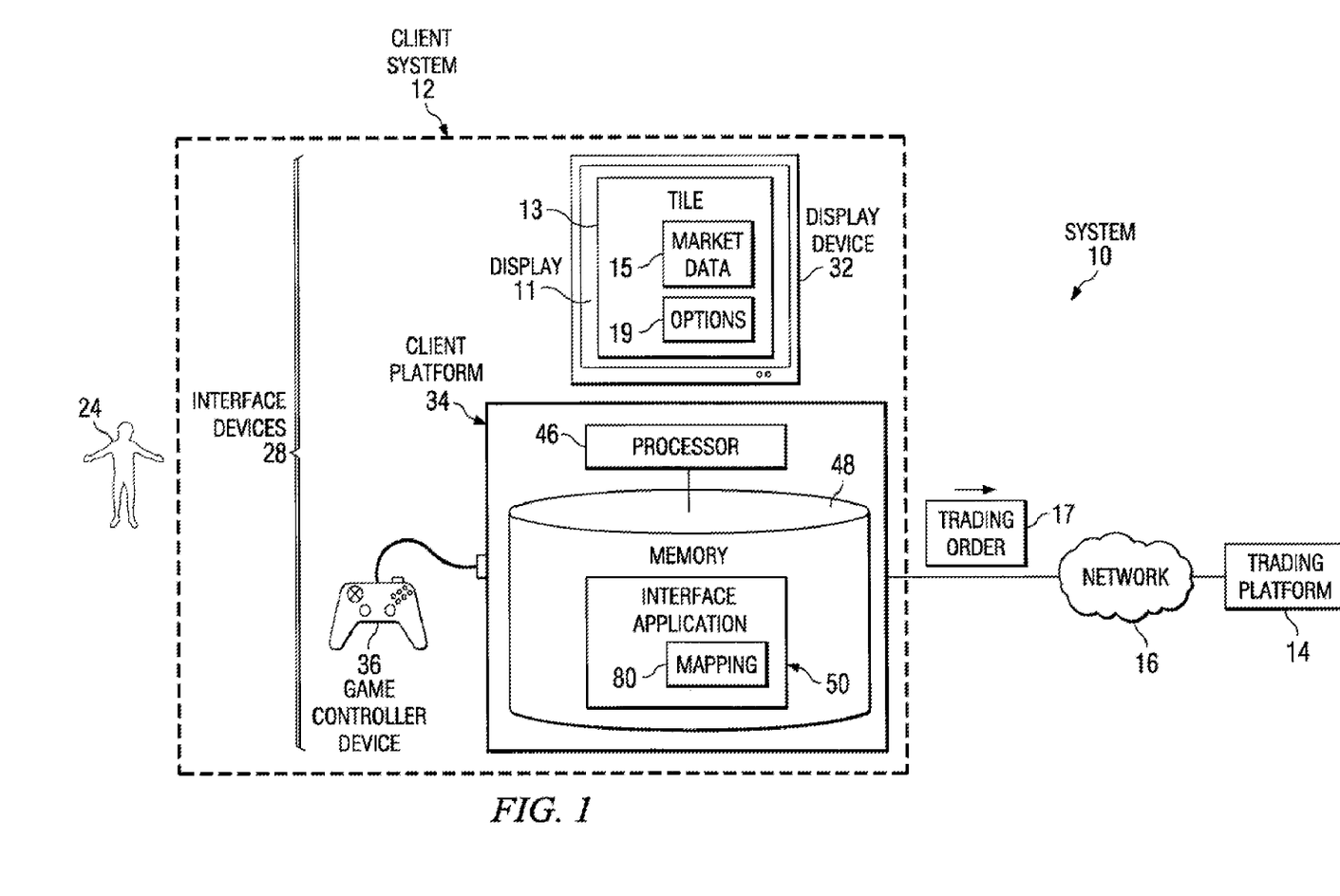
FIG. 1 illustrates one embodiment of an electronic trading system.

FIG. 1 illustrates one embodiment of an electronic trading system 10 operable to facilitate trading for traders 24. System 10 includes a client system 12, a trading platform 14, and a network 16, coupled as shown. Client system 12 includes interface devices 28 (such as a game controller device 36 and a display device 32) and a client platform 34. Client platform 34 includes a processor 46 and a memory 48.

In one example, client system 12 generates a display 11 that has tiles 13 that display information describing trading products. A tile 13 displays market data 15 for a trading product. Market data 15 is received in near real-time from a market data center and provides near real-time information for tile 13. Market data 15 may include a bid quantity, an inside market price, and an offer quantity.

Tile 13 also displays options 19 from which trader may select to designate desired conditions for initiating a trade. The options may include quantities and bid-offer pairs for the trading product. Trader 24 uses knobs of game controller device 36 to make selections. One knob may be used to select a quantity, and another knob may be used to select a bid-offer pair.

Trader 24 may monitor market data 15, and may decide to initiate a trade in response to market data 15. Trader 24 uses buttons of game controller device 36 to initiate specific types of trades. One button may be used to initiate a bid and/or buy at the quantity and bid-offer pair selected by trader 24.

Another button may be used to initiate an offer and/or sell at the quantity and bid-offer pair selected by trader 24. Yet another button may be used to initiate a buy at the inside market price. And, yet another button may be used to initiate a sell at the inside market price. Although this description is explained with respect to knobs and buttons of game controller device 36 to perform particular actions, these actions may be performed using any suitable number and combination of knobs, buttons, or other portions of device 36.

Accordingly, trader 24 may readily read the bid quantity, the inside market price, and the offer quantity for a trading product from tile 13. In addition, trader may use tile 13 and game controller device 36 to easily select a quantity and a bid-offer pair for the trading product. Furthermore, trader 24 may use specific knobs and/or buttons of game controller device 36 to initiate specific types of trades.

According to one embodiment, traders 24 may represent users of trading system 10 capable of placing and/or responding to trading orders 17. A trader 24 may represent a principal, an agent acting on behalf of a principal, an individual, a legal entity (such as a corporation), or any machine or mechanism that is capable of placing and/or responding to trading orders 17.

A trading order 17 may represent an order to buy or sell a particular amount of a particular trading product. A trading product may refer to any suitable product or combination of products that forms the basis of a given trading order 17. Examples of trading products may include any type of goods, services, financial instruments, commodities, equities, stocks, fixed income securities, interest rate derivatives, currencies, futures contracts, debentures, options, securities, derivative trading instruments, or any other suitable product or combination of products.

A client system 12 may represent any suitable end-user element that may be used to access one or more elements of trading system 10, such as trading platform 14. Examples of an end-user element include a computer, a workstation, a telephone, an Internet browser, an electronic notebook, a personal digital assistant (PDA), a pager, or any other suitable device (wireless or otherwise) capable of receiving, processing, storing, and/or communicating information with other components of system 10.

Client system 12 may include interface devices 28 and a client platform 34. An interface device 28 may represent any suitable device operable to communicate signals to and/or from client platform 34 via a wired and/or a wireless link. Examples of interface devices 28 may include input devices, output devices, and/or input/output devices.

Examples of input devices include a game controller device 36, a keyboard, a mouse, a microphone, and/or another end-user element. Game controller device 36 represents any suitable input device that communicates with client platform 34. Examples of game controller devices 36 include video game controllers such as a joystick or a gamepad. An example of an output device includes a display device 32 that displays output information in a display 11. Examples of display devices 32 include a computer display, a CRT monitor, or a television.

Client platform 34 includes a processor 46 and a memory 48 coupled as shown. Processor 46 comprises any suitable combination of hardware and/or software to perform the functions described herein, including processing data associated with trading system 10, which may involve executing coded instructions associated with interface application 50.

Memory 48 comprises any suitable combination of volatile and/or non-volatile memory that stores and/or facilitates retrieval of information. Memory 48 may store interface application 50. Interface application 50 comprises an application that allows interface devices 28 to receive and/or transmit information. For example, interface application 50 may include a graphical user interface (GUI) application that generates display 11 on display device 32. In the example, interface application may change display 11 in response to commands from interface devices 28 and/or trading platform 14. In the example, interface application 50 may also send messages to interface devices 28 and/or trading platform 14 in response to commands from interface devices 28 and/or trading platform 14.

In the illustrated embodiment, interface application 50 includes a mapping module 80. Mapping module 80 maps signals received from interface devices 28 and/or trading platform 14 with commands of trading system 10. In one example, a signal may be sent by trader 24 moving a joystick, pressing a button, and/or performing any other manipulation of an interface device 28. In the example, a command may comprise a system command and/or a trading command. A system command may be used to alter display 11, for example, to move a cursor. A trading command may be communicated to or from trading platform 14 to, for example, initiate and/or process a trade.

Signal relationships may be used to associate a signal with a command. As an example, a manipulation (such as moving a joystick) may be associated with one command (such as moving a cursor). As another example, multiple manipulations (such as moving a joystick and pressing a button) may be associated with one command (such as sending a trading order request). As another example, a manipulation (such as pressing a button) may be associated with multiple commands (such as sending a trading order request and updating a display).

Trading platform 14 may represent a trading architecture that facilitates the processing of trading orders 17. Trading platform 14 may be configured at a management center or a headquartering office for any person, business, or entity that seeks to manage the trading of orders. Trading platform 14 may include any suitable combination of logic, personnel, devices, or entities that may be utilized to perform the operations of an administrative body or a supervising entity that manages or administers a trading environment.

A network 16 may represent a communication platform operable to exchange information. A communication network may comprise at least a portion of a plain old telephone system (POTS), a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Modifications, additions, or omissions may be made to trading system 10 without departing from the scope of the invention. The components of trading system 10 may be integrated or separated according to particular needs. Moreover, the operations of trading system 10 may be performed by more, fewer, or other modules.

Figure 2:
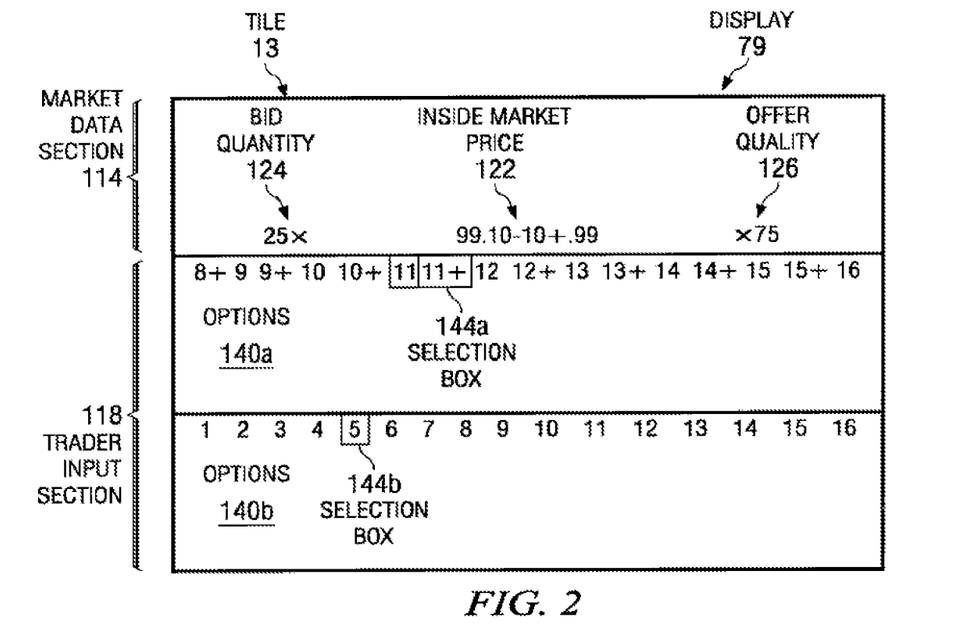
FIG. 2 illustrates an example of a display that includes a tile for use in the system of FIG. 1.

FIG. 2 illustrates an example of a display 11 that includes one or more tiles 13. According to one embodiment, a tile 13 may include a market data section 114 and a trader input section 118. Market data section 114 may display real-time market data 15. Market data 15 may be received in real-time or near real-time and may include current and/or historical market information such as trade volumes, trading conditions, trading volumes, numbers of outstanding trading orders 17, bid/offer prices, market prices, yield spreads, trends, and so forth.

According to the illustrated embodiment, market data section 114 includes an inside market price 122, a bid quantity 124, and an offer quantity 126 for a trading product. Bid quantity 124 is the quantity of the best bid for the trading product. Offer quantity 126 is the quantity of the best offer for the trading product. The inside market price represents the bid price of the best bid and the offer price of the best offer.

Trader input section 118 displays trader input that is input by a user such as trader 24. Examples of trader input include a quantity of the trading product and an input bid-offer pair for the trading product. A trader bid-offer pair comprises a bid price and an offer price designated by a trader 24.

According to the illustrated embodiment, trader input section 118 includes options 140 and selection boxes 144. Options 140 include numbers that may be selected by trader 24, and selection boxes 144 are used to indicate the selected numbers. According to the illustrated embodiment, trader input section 118 includes bid-offer pair options 140a and quantity options 140b. A bid-offer pair selection box 144a may indicate a bid-offer pair selected by trader 24, and a quantity selection box 144b may indicate a quantity selected by trader 24.

According to one embodiment, trader 24 may use game controller device 36 to move selection box 144 to options 140 that trader 24 would like to select. Trader 24 may move selection box 144 to the right or left of options 140 until an appropriate number is selected. A first selection box 144a may be moved to select a bid-offer pair, while a second selection box 144b may be moved to select a quantity. Although options 140a and 140b are illustrated in a horizontal arrangement, any suitable orientation of options 140a and 140b may be used.

Accordingly, trader 24 may readily read the bid quantity, the inside market price, and the offer quantity for a trading product from tile 13. In addition, trader may use tile 13 and game controller device 36 to easily select a quantity and a bid-offer pair for the trading product.

Modifications, additions, or omissions may be made to display 11 without departing from the scope of the invention. Display 11 may include more, less, or other data. Additionally, the data may be arranged in any suitable manner without departing from the scope of the invention.

Figure 3:
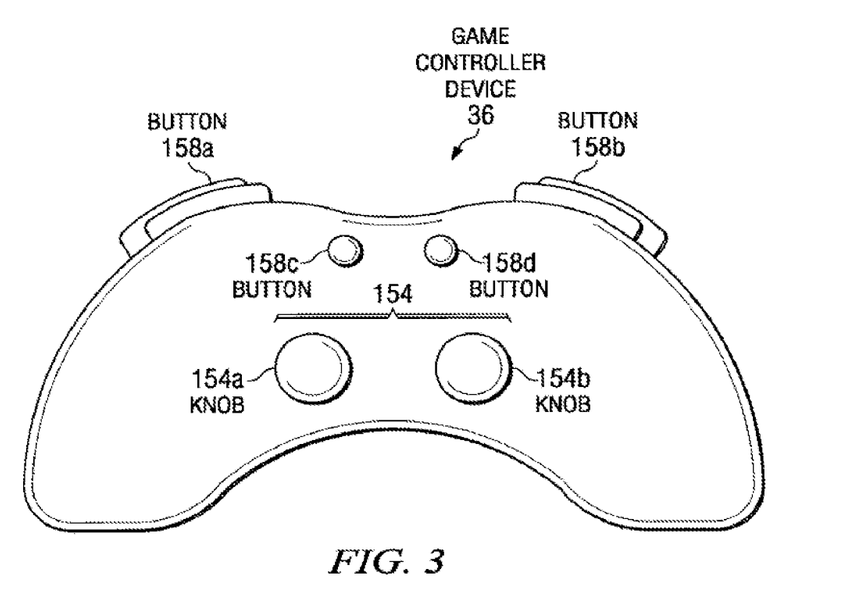
FIG. 3 illustrates an example of a game controller device for use in the system of FIG. 1.

FIG. 3 illustrates an example of game controller device 36. Game controller device 36 may include one or more knobs 154 and one or more buttons 158. In one embodiment, a trader 24 may manipulate knobs 154 and buttons 158 to initiate specific commands. Examples of manipulations may include depressing, lifting, translating, and/or rotating knobs 154 and/or buttons 158.

A knob 154 may be used to select an option 140 and may include any suitable device part, for example, a button, a joystick, or other type of part operable to move selection box 144 to an option 140. Any suitable number of knobs 154 may be used to select numbers. According to one embodiment, a particular knob 154 may be designated to select numbers from specific options 140. In the illustrated example, knob 154a may be used to select from options 140a, and knob 154b may be used to select from options 140b. According to another embodiment, one knob 154 may be used to select among multiple sets of options 140. As an example, a joystick may be used in a first direction, for example, in an up-down direction to select a particular set of options 140. The joystick may then be moved in a second direction, for example, a left-right direction, in order to select particular numbers of the particular options 140.

A button 158 may be used to send a request that initiates a trade. A trade may refer to a procedure for placing and/or responding to a trading order 17. Examples of trades include a bid, buy, offer, sell, buy at market price, or sell at market price procedure. A bid procedure places a bid for a trading product; a buy procedure places a buy order to buy a trading product; an offer procedure places an offer for a trading product; a sell procedure places a sell order to sell a trading product; a buy at market price procedure places a buy order to buy a trading product at the market price; and a sell at market price procedure places a sell order to sell a trading product at the market price.

Any suitable number of buttons 158 may be used to initiate any suitable trades. According to the illustrated embodiment, button 158a may be used to initiate a bid and/or buy procedure; button 158b may be used to initiate an offer and/or sell procedure; button 158c may be used to initiate a buy at market price procedure; and button 158c may be used to initiate a sell at market price procedure.

Accordingly, trader 24 may use knobs 154 of game controller device 36 to easily select a quantity and a bid-offer pair for a trading product. Furthermore, trader 24 may use specific buttons 158 of game controller device 36 to initiate different types of trades.

Modifications, additions, or omissions may be made to game controller device 36 without departing from the scope of the invention. The components of game controller device 36 may be integrated or separated according to particular needs. Moreover, the operations of game controller device 36 may be performed by more, fewer, or other knobs 154 and/or buttons 158.

Figure 4:
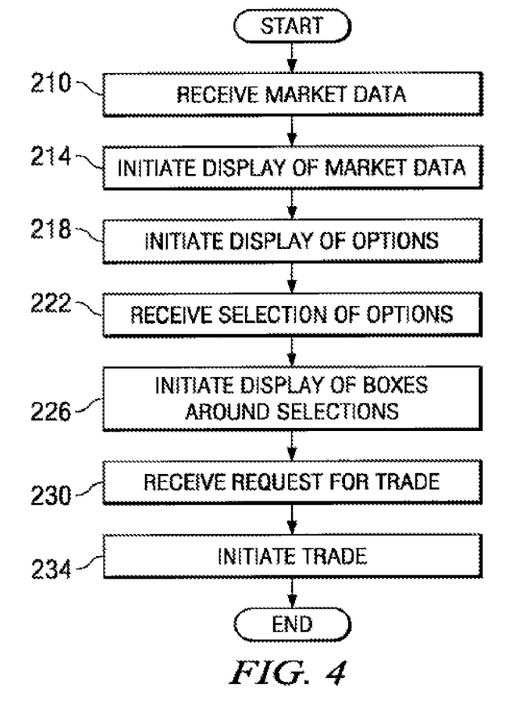
FIG. 4 illustrates one embodiment of a method for displaying one or more tiles.

FIG. 4 illustrates one embodiment of a method for displaying one or more tiles 13. The method begins at step 210, where interface application 50 receives market data 15 from trading platform 14. Market data 15 may include, for example, inside market price 122, bid quantity 124, and offer quantity 126 for a trading product. Interface application 50 initiates display of market data 15 in market data section 114 of tile 13 at step 214.

Interface application 50 initiates display of options 140 in trader input section 118 at step 218. Options 140 may include bid-offer pair options 140a and quantity options 140b. Interface application 50 receives trader 24's selection of options 140 at step 222. Trader 24 may use knobs 154 of game controller device 36 to make the selections. For example, trader 24 may select bid-offer pair 11/11+ and quantity 5.

Updating of trader input section 118 is initiated at step 226 to display the selections. Trader input section 118 may be updated by maneuvering selection boxes 144 around the selected options 140. For example, selection box 144a may be placed at 11/11+ and selection box 144b may be placed at 5.

A request for a trade is received at step 230. Trader 24 may use buttons 158 of game controller device 36 to make the request. The trade is initiated at step 234. The trade may be initiated by forwarding the request to trading platform 14. After initiating the trade, the method terminates.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. An apparatus comprising:

an input device having a plurality of discrete input actuators for receiving user input, the plurality of discrete input actuators including a first input actuator, a second input actuator, a third input actuator, a fourth input actuator, a fifth input actuator, and a sixth input actuator, a computing device to, based on input data from the plurality of discrete input actuators, send and receive signals to a trading apparatus, the trading apparatus comprising a display screen, the trading apparatus being configured to render a graphical user interface and a graphical selection box on the display screen, the graphical user interface comprising a market data section, a first input section, and a second input section, such that the market data section borders the first input section and the first input section borders the second input section, wherein the first input section comprises a first graphical box having a rectangle shape where first data is displayed to span across a first top inside portion area of the first graphical box in a horizontal manner, and wherein a first graphical selection box of the first input section is capable of being moved across in a horizontal manner to highlight at least a portion of the first data, wherein the second input section comprises a second graphical box having a rectangle shape where second data is displayed to span across a second top inside portion area of the second graphical box in a horizontal manner, and wherein a second graphical selection box of the second input section is capable of being moved across in a horizontal manner to highlight at least a portion of the second data simultaneously with movement of the first graphical selection box within the first input section, wherein the first input section and the second input section are displayed below the market data section, wherein movement of the graphical selection box of the first input section is independent of movement of the graphical selection box of the second input section;

wherein the first input actuator, upon actuation, generates actuation signals representing an up-down and left-right directions in response to movement in an up-down and left-right direction, which upon detection of movement in a given up-down or left-right direction, instructs the trading apparatus to move the first graphical selection box in the given direction in the first input section to select a first entry among the first data;

wherein the second input actuator, upon actuation, instructs the trading apparatus to select a bid-offer pair highlighted by the graphical selection box in the first input section;

wherein the third input actuator, upon actuation, instructs the trading apparatus to select a quantity highlighted by the graphical selection box in the second input section;

wherein the fourth input actuator, upon actuation, instructs the trading apparatus to initiate a bid or buy procedure based at least in part on a selected bid-offer pair and the selected quantity; and wherein the fifth input actuator, upon actuation, instructs the trading apparatus to initiate an offer or sale procedure based at least in part on the selected bid-offer pair and the selected quantity, wherein the sixth input actuator is actuatable to instruct the trading apparatus to move the second graphical selection box in the given direction in the second input section to select a second entry among the second data, wherein the first and sixth input actuators are simultaneously actuatable to respectively control simultaneous movement of the first and second graphical selection boxes within the first and second graphical boxes.

2. The apparatus of claim 1, wherein the computing device is configured to communicate with the trading apparatus and configured to map a combination of the input interface actuations to a particular trading command.

3. The apparatus of claim 1, wherein the plurality of discrete input actuators includes a sixth input actuator which, upon actuation, instructs the trading apparatus to initiate a buy procedure at an inside market price.

4. The apparatus of claim 1, wherein the plurality of discrete input actuators includes a seventh input actuator which, upon actuation, instructs the trading apparatus to initiate a sell procedure at an inside market price.

5. The apparatus of claim 1, wherein market data is received in near real time from a market data center and the market data is to populate in near real time the market data section.

6. The apparatus of claim 1, wherein the computing device is further configured to communicate with the trading apparatus which comprises a trading platform that comprises a trading architecture to facilitate processing of trading orders.

7. The apparatus of claim 1, wherein the first input actuator is coupled to a first control knob, and the sixth input actuator is coupled to a second control knob, and wherein the first and second control knobs are simultaneously movable to respectively control the simultaneous movement of the first and second graphical selection boxes within the first and second graphical boxes.

8. A method comprising;

receiving user input data from a plurality of discrete input actuators of an input device, the plurality of discrete input actuators including a first input actuator, a second input actuator, a third input actuator, a fourth input actuator, a fifth input actuator, and a sixth input actuator; and communicating, by a computing device and based on the user input data from the plurality of discrete input actuators, signals with a trading apparatus, the trading apparatus comprising a display screen, the trading apparatus being configured to render a graphical user interface and a graphical selection box on the display screen, the graphical user interface comprising a market data section, a first input section, and a second input section, such that the market data section borders the first input section and the first input section borders the second input section, wherein the first input section comprises a first graphical box having a rectangle shape where first data is displayed to span across a first top inside portion area of the first graphical box in a horizontal manner, and wherein a first graphical selection box of the first input section is capable of being moved across in a horizontal manner to highlight at least a portion of the first data, wherein the second input section comprises a second graphical box having a rectangle shape where second data is displayed to span across a second top inside portion area of the second graphical box in a horizontal manner, and wherein a second graphical selection box of the second input section is capable of being moved across in a horizontal manner to highlight at least a portion of the second data simultaneously with movement of the first graphical selection box within the first input section, wherein the first input section and the second input section are displayed below the market data section, wherein movement of the graphical selection box of the first input section is independent of movement of the graphical selection box of the second input section; and wherein said communicating signals with the trading apparatus comprises:

based on actuation of the first input actuator, generating actuation signals representing an up-down and left-right directions in response to movement in an up-down and left-right direction, which upon detection of movement in a given up-down or left-right direction, instructs the trading apparatus to move the first graphical selection box in the given direction in the first input section to select a first entry among the first data, based on actuation of the second input actuator, instructing the trading apparatus to select a bid-offer pair highlighted by the graphical selection box in the first input section, based on actuation of the third input actuator, instructing the trading apparatus to select a quantity highlighted by the graphical selection box in the second input section, based on actuation of the fourth input actuator, instructing the trading apparatus to initiate a bid or buy procedure based at least in part on a selected bid-offer pair and the selected quantity, based on actuation of the fifth input actuator, instructing the trading apparatus to initiate an offer or sale procedure based at least in part on the selected bid-offer pair and the selected quantity, and based on actuation of the sixth input actuator, generating actuation signals instructing the trading apparatus to move the second graphical selection box in the given direction in the second input section to select a second entry among the second data, wherein the first and sixth input actuators are simultaneously actuatable to respectively control simultaneous movement of the first and second graphical selection boxes within the first and second graphical boxes.

9. The method of claim 8, further comprising mapping a combination of the input interface actuations to a particular trading command.

10. The method of claim 8, further comprising, based on actuation of a seventh input actuator of the plurality of discrete input actuators, instruct the trading apparatus to initiate a buy procedure at an inside market price.

11. The method of claim 8, further comprising, based on actuation of a seventh input actuator of the plurality of discrete input actuators, the trading apparatus to initiate a sell procedure at an inside market price.

12. The method of claim 8, wherein market data is received in near real time from a market data center and the market data is to populate in near real time the market data section.

13. The method of claim 8, wherein the trading apparatus comprises a trading platform that comprises a trading architecture to facilitate processing of trading orders.

14. A non-transitory computer-readable medium having stored thereon instructions that are configured to, when executed by at least one computing device, direct the at least one computing device to:

receive user input from a plurality of discrete input actuators of an input device, the plurality of discrete input actuators including a first input, a second input actuator, a third input actuator, a fourth input actuator, a fifth input actuator, and a sixth input actuator;

communicate signals to a trading apparatus based on the user input data, the trading apparatus comprising a display screen, the trading apparatus being configured to render a graphical user interface and a graphical selection box on the display screen, the graphical user interface comprising a market data section, a first input section, and a second input section, such that the market data section borders the first input section and the first input section borders the second input section, wherein the first input section comprises a first graphical box having a rectangle shape where first data is displayed to span across a first top inside portion area of the first graphical box in a horizontal manner, and wherein a first graphical selection box of the first input section is capable of being moved across in a horizontal manner to highlight at least a portion of the first data simultaneously with movement of the first graphical selection box within the first input section, wherein the second input section comprises a second graphical box having a rectangle shape where second data is displayed to span across a second top inside portion area of the second graphical box in a horizontal manner, and wherein a second graphical selection box of the second input section is capable of being moved across in a horizontal manner to highlight at least a portion of the second data, wherein the first input section and the second input section are displayed below the market data section, and wherein movement of the graphical selection box of the first input section is independent of movement of the graphical selection box of the second input section, instruct the trading apparatus to move the first graphical selection box in the given direction in the first input section based on user input data from the first input actuator that includes up-down or left-right commands corresponding to up-down or left-right movement of the first input actuator, to select a first entry among the first data;

instruct the trading apparatus to select a bid-offer pair highlighted by the graphical selection box in the first input section based on user input data from the second input actuator;

instruct the trading apparatus to select a quantity highlighted by the graphical selection box in the second input section based on user input data from the third input actuator;

instruct the trading apparatus to initiate a bid or buy procedure based at least in part on a selected bid-offer pair and the selected quantity based on user input data from the fourth input actuator;

instruct the trading apparatus to initiate an offer or sale procedure based at least in part on the selected bid-offer pair and the selected quantity based on user input data from the fifth input actuator; and instruct the trading apparatus to move the second graphical selection box in the given direction in the second input section based on user input data from the sixth input actuator, to select a second entry among the second data, wherein the first and sixth input actuators are simultaneously actuatable to respectively control simultaneous movement of the first and second graphical selection boxes within the first and second graphical boxes.

15. The non-transitory computer-readable medium of claim 14, wherein the medium having stored thereon instructions that are configured to, when executed by the at least one computing device, direct the at least one computing device to allow the trading apparatus to be further configured to map a combination of the input interface actuations to a particular trading command.

16. The non-transitory computer-readable medium of claim 14, wherein the medium having stored thereon instructions that are configured to, when executed by the at least one computing device and based on user input data from a sixth input actuator of the plurality of discrete input actuators, instruct the trading apparatus to initiate a buy procedure at an inside market price.

17. The non-transitory computer-readable medium of claim 14, wherein the medium having stored thereon instructions that are configured to, when executed by the at least one computing device and based on user input data from a sixth input actuator of the plurality of discrete input actuators, instruct the trading apparatus to initiate a sell procedure at an inside market price.

18. The non-transitory computer-readable medium of claim 14, wherein the medium having stored thereon instructions that are configured to, when executed by the at least one computing device, direct the at least one computing device to receive market data in near real time from a market data center and the market data is to populate in near real time the market section.

19. The non-transitory computer-readable medium of claim 14, wherein the medium having stored thereon instructions that are configured to, when executed by at least one computing device, direct the at least one computing device to communicate with the trading apparatus configured as a trading platform that comprises a trading architecture to facilitate processing of trading orders.

* * * * *